(12) United States Patent
Zhou et al.

(10) Patent No.: US 11,928,613 B1
(45) Date of Patent: Mar. 12, 2024

(54) BEARING FAULT DIAGNOSIS METHOD BASED ON FUZZY BROAD LEARNING MODEL

(71) Applicant: EAST CHINA JIAOTONG UNIVERSITY, Nanchang (CN)

(72) Inventors: Jianmin Zhou, Nanchang (CN); Xiaotong Yang, Nanchang (CN); Hongyan Yin, Nanchang (CN)

(73) Assignee: EAST CHINA JIAOTONG UNIVERSITY, Nanchang (CN)

( * ) Notice: Subject to any disclaimer, the term of this patent is extended or adjusted under 35 U.S.C. 154(b) by 0 days.

(21) Appl. No.: 18/348,327

(22) Filed: Jul. 6, 2023

(30) Foreign Application Priority Data

Oct. 17, 2022 (CN) .................. 202211264745.X (51) Int. Cl.
 *G06N 7/02* (2006.01)
(52) U.S. Cl.
 CPC .................. *G06N 7/023* (2013.01)
(58) Field of Classification Search
 CPC ................................................. G06N 7/023
 See application file for complete search history.

(56) References Cited

U.S. PATENT DOCUMENTS

| 11,121,788 | B1 | 9/2021 | He et al. | |
|---|---|---|---|---|
| 2017/0315516 | A1* | 11/2017 | Kozionov | G01M 13/045 |
| 2019/0183428 | A1 | 6/2019 | Fu et al. | |

FOREIGN PATENT DOCUMENTS

| CN | 104502103 | A | * | 4/2015 | | |
|---|---|---|---|---|---|---|
| CN | 104502103 | A | | 4/2015 | | |
| CN | 106441888 | A | | 2/2017 | | |
| CN | 107228766 | B | * | 3/2019 | ......... | G01M 13/045 |
| CN | 110472741 | A | | 11/2019 | | |
| CN | 110849627 | A | | 2/2020 | | |
| CN | 110928187 | A | | 3/2020 | | |
| CN | 110929835 | A | | 3/2020 | | |
| CN | 113865868 | A | | 12/2021 | | |
| CN | 113987834 | A | | 1/2022 | | |

(Continued)

OTHER PUBLICATIONS

Zheng, Jinde, et al. "A rolling bearing fault diagnosis method based on multi-scale fuzzy entropy and variable predictive model-based class discrimination." Mechanism and machine theory 78 (2014): 187-200. (Year: 2014).*

(Continued)

*Primary Examiner* — Eric Nilsson (57) ABSTRACT

A bearing fault diagnosis method based on a fuzzy broad learning mode includes steps of constructing an initial fuzzy broad learning model based on a broad learning system and a fuzzy system, training the initial fuzzy broad learning model through training set data to obtain a target fuzzy broad learning model. The training set data includes a plurality of bearing vibration signal data with a fault type label; and a membership value of a bearing vibration signal data to be tested is calculated by the target fuzzy broad learning model. A fault type of the bearing to be tested is determined based on the membership value. The bearing fault diagnosis method reduces learning time. When determining the fault type of the bearing to be tested by the target fuzzy broad learning model, it has strong robustness, fast diagnosis speed and high fault diagnosis accuracy.

9 Claims, 5 Drawing Sheets

(56) References Cited

FOREIGN PATENT DOCUMENTS

| | | |
|---|---|---|
| CN | 114216682 A | 3/2022 |
| CN | 114676783 A | 6/2022 |
| CN | 114897032 A | 8/2022 |

OTHER PUBLICATIONS

Zhang Wenxing et al., "Fault Diagnosis of Bearing Based on Double Tree Complex Wavelet and Broad Learning System", Mechanical Design and Manufacturing, Issue 5 (2022), issued date May 31, 2022.

Li Runze et al.: "A Photovoltaic Power Prediction Method Based on Fuzzy Broad Learning System", Control 2 Engineering, vol. 27, Issue 11, Issued date Nov. 30, 2020.

\* cited by examiner

BEARING FAULT DIAGNOSIS METHOD BASED ON FUZZY BROAD LEARNING MODEL

TECHNICAL FIELD

The present disclosure relates to a technical field of bearing detection, and in particular to a bearing fault diagnosis method based on a fuzzy broad learning model.

BACKGROUND

Bearings are one type of the most frequently used components in train running. In modern train operation, the bearings are key components determining safe operation of a train. Due to harsh working conditions of the train bearings, numerous failure triggers may lead to safety problems, causing certain losses and impacts on social economic and safety benefits, so it is significant to timely and effectively find a fault degree and a fault type of the train bearings.

At present, a conventional bearing fault diagnosis method based on a fuzzy broad learning model mainly comprises steps of feature extraction and fault classification. The feature extraction is an important step in fault diagnosis. Before feature extraction, signals of a bearing in operation need to be collected. In various studies of rolling bearing fault diagnosis, the most practical and mature method is mechanical signal analysis because the mechanical signal analysis can identify bearing faults by focusing on intrinsic frequencies with small vibrations. Numerous scholars conclude from their analysis that the bearing faults are detected by analyzing a current frequency of a motor, stray flux signals, thermal imaging images, and acoustic emission signals. However, the fault diagnosis thereof is inaccurate and collection difficulty is high. Meanwhile, it is necessary to quickly and accurately diagnose a fault type of the bearing in practical application, and the conventional bearing fault diagnosis method is generally unable to do both.

SUMMARY

In view of this, a purpose of the present disclosure is to provide a bearing fault diagnosis method based on a fuzzy broad learning model to solve defects in the prior art.

To achieve the above purpose, the present disclosure provides the bearing fault diagnosis method based on the fuzzy broad learning model. The bearing fault diagnosis method comprises:
collecting vibration signal data of bearings in operation, and preprocessing the vibration signal data of the bearings in operation;
extracting time-domain feature parameters, frequency-domain feature parameters, and time-frequency-domain feature parameters from preprocessed vibration signal data;
performing a fusion processing and a normalization processing on the time-domain feature parameters, the frequency-domain feature parameters, and the time-frequency-domain feature parameters in sequence to obtain a fused data set; dividing the fused data set into training set data and test set data according to a predetermined ratio;
constructing an initial fuzzy broad learning model based on a broad learning system and a fuzzy system;
training the initial fuzzy broad learning model through the training set data to obtain a target fuzzy broad learning model; and
calculating a membership value of vibration signal data of a bearing to be tested by the target fuzzy broad learning model; and determining a fault type of the bearing to be tested according to the membership degree value.

In the present disclosure, by constructing the initial fuzzy broad learning model and by training the initial fuzzy broad learning model through processed training set data, the target fuzzy broad learning model is obtained. The target fuzzy broad learning model reserves a structure of the broad learning system and is able to be popularized increments, input nodes, and enhancement nodes of fuzzy subsystems in the fuzzy system, so that the target fuzzy broad learning model is easily adapted to increments of the input nodes, feature nodes, and the enhancement nodes without retraining the target fuzzy broad learning model. When calculating the membership value of the vibration signal data of the bearing to be tested by the target fuzzy broad learning model and determining the fault type of the bearing to be tested according to the membership degree value, the learning time of the model is reduced. Moreover, when determining the fault type of the bearing to be tested by the target fuzzy broad learning model, it has strong robustness, fast diagnosis speed and high fault diagnosis accuracy.

Optionally, a step of preprocessing the vibration signal data of the bearings in operation comprises:
extracting different vibration signal data features from the vibration signal data of the bearings in operation; and
cropping the vibration signal data of the bearings in operation to obtain vibration signal samples, each of the vibration signal samples is matched with a corresponding vibration signal data feature of the vibration signal data features.

Optionally, the normalization processing is expressed by a function formula:

$$x' = \frac{x - \min(x)}{\max(x) - \min(x)}.$$

Where x is a total feature set formed by fusing the time-domain feature parameters, the frequency-domain feature parameters, and the time-frequency-domain feature parameters. x' is a normalized feature set. min (x) is a minimum value of the total feature set. max (x) is a maximum value of the total feature set.

Optionally, a step of constructing the initial fuzzy broad learning model based on the broad learning system and the fuzzy system comprises:
replacing feature nodes in the broad learning system with fuzzy subsystems in the fuzzy system;
sending intermediate outputs generated by the fuzzy subsystems replaced into the broad learning system to enhancement nodes of the broad learning system for nonlinear transformation; and
integrating inputs from the fuzzy subsystems replaced into the broad learning system and inputs from the enhancement nodes in the broad learning system to construct the initial fuzzy broad learning model; generating a model output, by the initial fuzzy broad learning model, according to integrated inputs from the fuzzy subsystems replaced into the broad learning system and the enhancement nodes in the broad learning system.

Optionally, after a step of training the initial fuzzy broad learning model through the training set data to obtain the target fuzzy broad learning model, the bearing fault diagnosis method further comprises:

testing the target fuzzy broad learning model by the test set data, and determining whether the target fuzzy broad learning model is qualified according to a test result; and if yes, executing a step of calculating the membership value of the vibration signal data of the bearing to be tested by the target fuzzy broad learning model.

Optionally, the target fuzzy broad learning model comprises a fuzzy broad learning algorithm. A step of calculating the membership value of the vibration signal data of the bearing to be tested by the target fuzzy broad learning model and determining the fault type of the bearing to be tested according to the membership value comprises:

calculating the membership value of the vibration signal data of the bearing to be tested by the fuzzy broad learning algorithm, and calculating a classification matrix of the vibration signal data of the bearing to be tested according to the membership degree value;

and determining the fault type of the bearing to be tested according to a fault sample feature database and the classification matrix.

Optionally, before a step of determining the fault type of the bearing to be tested according to the fault sample feature database and the classification matrix, the bearing fault diagnosis method further comprises constructing the fault sample feature database.

The fault sample feature database comprises bearing vibration signal samples with fault type labels. Each of the fault type labels is matched with a label matrix.

Optionally, after a step of constructing the fault sample feature database, the bearing fault diagnosis method further comprises:

classifying samples of known fault types through the fuzzy broad learning model based on the fault sample feature database.

Optionally, calculation formulas of the classification matrix are as follow:

$$U=[U_{ij}]_{c \times n};$$

$$v=[v_1,v_2,v_3 \ldots v_c]^T;$$

$$d=\|xj-vj\|=(x_j-v_i)^T;$$

$$J(U, V) = \sum_{j=1}^{n} \sum_{i=1}^{c} u_{ij}^m d_{ij}.$$

Where J is a target function. $u_{ij}$ is a membership value of any data point $x_j$ relative to a clustering center $v_i$. $d_{ij}$ is a Euclidean distance of any data point $x_j$ relative to the clustering center $v_i$. U is the classification matrix. V is a clustering center vector. $x_j$ is a $j^{th}$ input sample. $v_i$ is an $i^{th}$ clustering center vector. c is the number of clustering center vectors. n is the number of input samples. m is a fuzzy weighting index; T is a transposed symbol.

Optionally, the initial fuzzy broad learning model comprises fuzzy subsystems, enhancement nodes, and a system output. A step of training the initial fuzzy broad learning model through the training set data to obtain the target fuzzy broad learning mode comprises after inputting the training set data into the initial fuzzy broad learning model, continuously adjusting parameter values of the fuzzy subsystems, the enhancement nodes, and the system output until an optimal result is output, so as to obtain the target fuzzy broad learning model.

Additional aspects and characteristics of the present disclosure will be given in part in the following description. Parts of the present disclosure will become apparent from the following description, or will be understood through the practice of the present disclosure.

The following specific embodiments will further illustrate the present disclosure in conjunction with the accompanying drawings above.

DETAILED DESCRIPTION

In order to make objectives, technical solutions, and advantages of the present disclosure clearer, the following further describes the present disclosure in detail with reference to accompanying drawings and embodiments. It should be understood that the specific embodiments described here are only used to explain the present disclosure, but not to limit the present disclosure. Based on the embodiments of the present disclosure, all other embodiments obtained by those of ordinary skill in the art without creative work shall fall within the protection scope of the present disclosure.

Obviously, the drawings in the following description are merely some examples or embodiments of the present disclosure, and for those skilled in the art, the present disclosure may also be applied to other similar scenarios according to these drawings. In addition, it is understood that although efforts made in such a development process may be complex and lengthy, for those skilled in the art related to the disclosure of the present disclosure, some designs, manufacturing, or production changes made on the basis of the technical content disclosed in the present disclosure are merely conventional technical means, which should not be understood that the content disclosed in the present disclosure is insufficient.

Reference herein to "embodiment" means that a particular feature, structure, or characteristic described in connection with one embodiment may be included in at least one embodiment of the present disclosure. The appearances of the "embodiment" in various positions in the specification are not necessarily referring to the same embodiment, and are not independent or alternative embodiments mutually exclusive of other embodiments. Those skilled in the art explicitly and implicitly understand that the embodiments described herein may be combined with other embodiments.

Unless otherwise defined, technical terms or scientific terms used in the present disclosure shall have the ordinary meaning as understood by those skilled in the art to which the present disclosure relates. The terms "one", "a", "a", "the", and other similar terms in the present disclosure do not indicate quantitative limitation, the features limited by these terms may be singular or plural. In the present disclosure, terms "comprise", "include", "have", and any variations thereof are intended to cover non-exclusive inclusion, e.g., includes a series of steps or units, processes, methods, systems, products, or devices, which are not limited to the listed steps or units, but may optionally further include steps or units not listed, or optionally further includes steps or units inherent to the processes, methods, products, or devices.

The terms "connection", "connected", "coupling", and other similar terms in the present disclosure are not limited to physical or mechanical connections, but also include electrical connections, whether direct or indirect. The term "a plurality of" means two or more. The term "and/or" depict relationship between associated objects and there are three relationships thereon. For example, A and/or B may indicate A exists alone, A and B exist at the same time, and B exists alone. The character "/" generally indicates that the associated object is alternative. The terms "first", "second", "third", etc. in the present disclosure are used only to distinguish similar objects and do not imply a specific ordering of objects.

Embodiments of the present disclosure provide a bearing fault diagnosis method based on a fuzzy broad learning model.

According to the bearing fault diagnosis method based on the fuzzy broad learning model, a bearing vibration signal of a train bearing is detected based on the fuzzy broad learning model. The fuzzy broad learning model (FBLS) fuses a Takagi Sugeno (TS) fuzzy system with a broad learning system (BLS), replaces conventional feature nodes with fuzzy subsystems in the TS fuzzy system, then sends all intermediate outputs generated by the fuzzy subsystems to enhancement nodes as a vector connection for further nonlinear transformation, and finally integrates input from the fuzzy subsystems and the enhancement nodes to generate output. By using the FBLS model, an adjustment process of the sparse auto-encoder in the BLS is omitted, and structural complexity of the FBLS model is reduced. Furthermore, compared with the conventional TS fuzzy model, the FBLS has fewer rules, shorter operation time and better operation effect, so the FBLS is configured to diagnose a fault of the train bearing, and a fault type of the train bearing is quickly and accurately diagnosed according to the bearing vibration signal.

Figure 1:
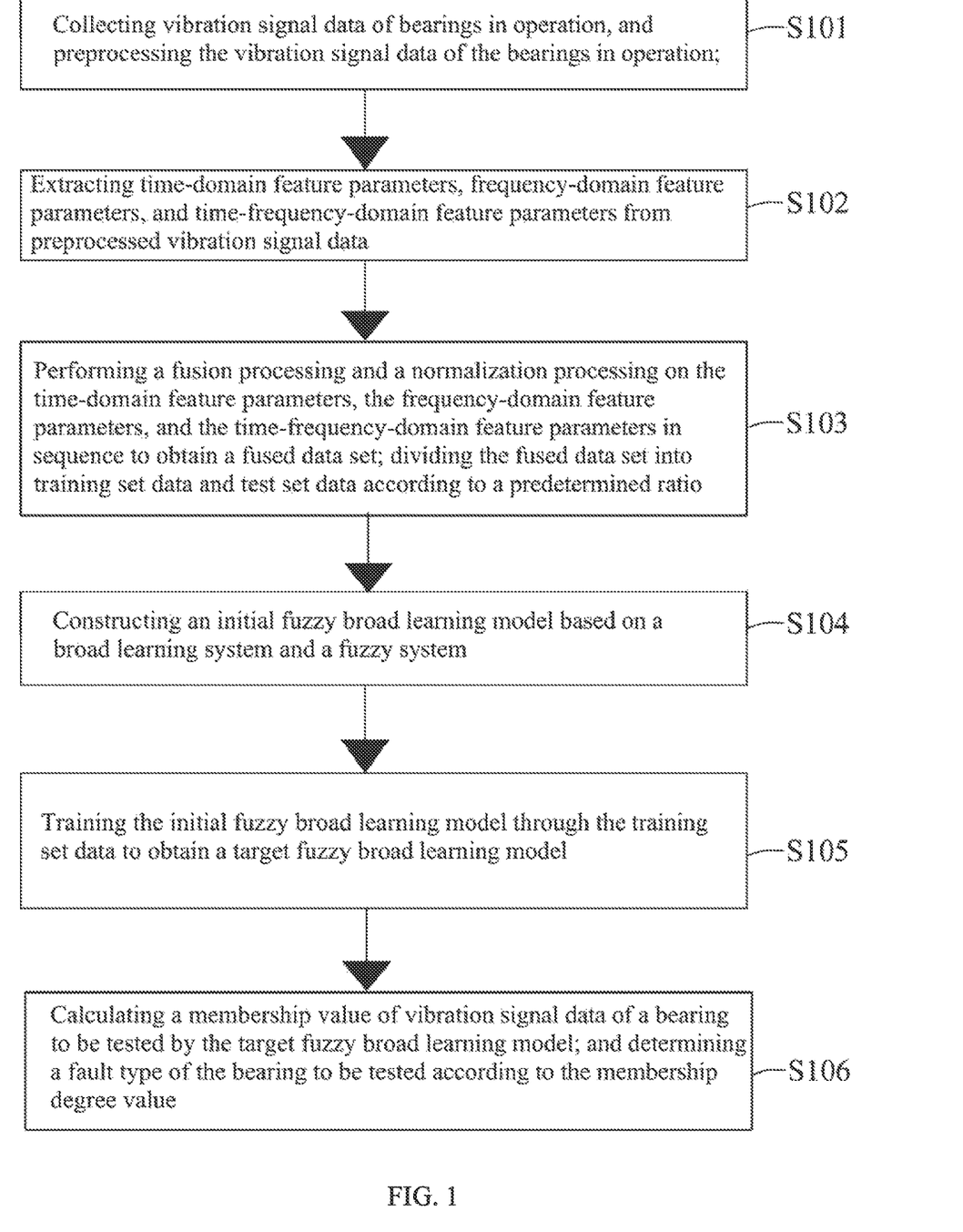
FIG. 1 is a flow chart of a bearing fault diagnosis method based on a fuzzy broad learning model according to one embodiment of the present disclosure.

FIG. 1 is a flow chart of the bearing fault diagnosis method based on the fuzzy broad learning model according to one embodiment of the present disclosure. As shown in FIG. 1, the bearing fault diagnosis method comprises:

Step S101: collecting vibration signal data of bearings in operation, and preprocessing the vibration signal data of the bearings in operation;

Where the step of preprocessing the vibration signal data of the bearings in operation comprises:

Step S1011: extracting different vibration signal data features from the vibration signal data of the bearings in operation; and Step S1012: cropping the vibration signal data of the bearings in operation to obtain vibration signal samples, each of the vibration signal samples is matched with a corresponding vibration signal data feature of the vibration signal data features.

Step 102: extracting time-domain feature parameters, frequency-domain feature parameters, and time-frequency-domain feature parameters from preprocessed vibration signal data;

Where the time-domain feature parameters, the frequency-domain feature parameters, and the time-frequency-domain feature parameters are extracted from the vibration signal samples obtained by cropping the vibration signal data of the bearings in operation. The time-domain feature parameters, the frequency-domain feature parameters, and the time-frequency-domain feature parameters separately comprises a maximum value, a minimum value, an average value, a peak-peak value, a rectification average value, an effective value, a peak value, a variance, a standard deviation, a kurtosis, a skewness a root mean square, a waveform factor, a peak factor, a pulse factor, a margin factor, a gravity center frequency, a mean square frequency, and a frequency variance.

It should be noted that the time-frequency-domain features are extracted by wavelet packet energy entropy, so as to obtain a feature with more information Namely, a db5 wavelet packet is configured to perform three-layer wavelet packet decomposition on the vibration signal, and an energy ratio of eight frequency sub-bands is generated. It is understood that the time-domain feature parameters, the frequency-domain feature parameters, and the time-frequency-domain feature parameters extracted are normalized to serve as an input feature sequence.

Step S103: performing a fusion processing and a normalization processing on the time-domain feature parameters, the frequency-domain feature parameters, and the time-frequency-domain feature parameters in sequence to obtain a fused data set; dividing the fused data set into training set data and test set data according to a predetermined ratio;

The normalization processing is expressed by a function formula:

$$x' = \frac{x - \min(x)}{\max(x) - \min(x)}.$$

Where x is a total feature set formed by fusing the time-domain feature parameters, the frequency-domain feature parameters, and the time-frequency-domain feature parameters. x' is a normalized feature set. min (x) is a minimum value of the total feature set. max (x) is a maximum value of the total feature set.

It is understood that the predetermined ratio is customized, and in the embodiment, the predetermined ratio is 8:2. That is, the fused data set is divided according to a ratio of 8:2 to obtain the training set data and the test set data. The test set data is configured to test a trained target fuzzy broad learning model.

Figure 2:
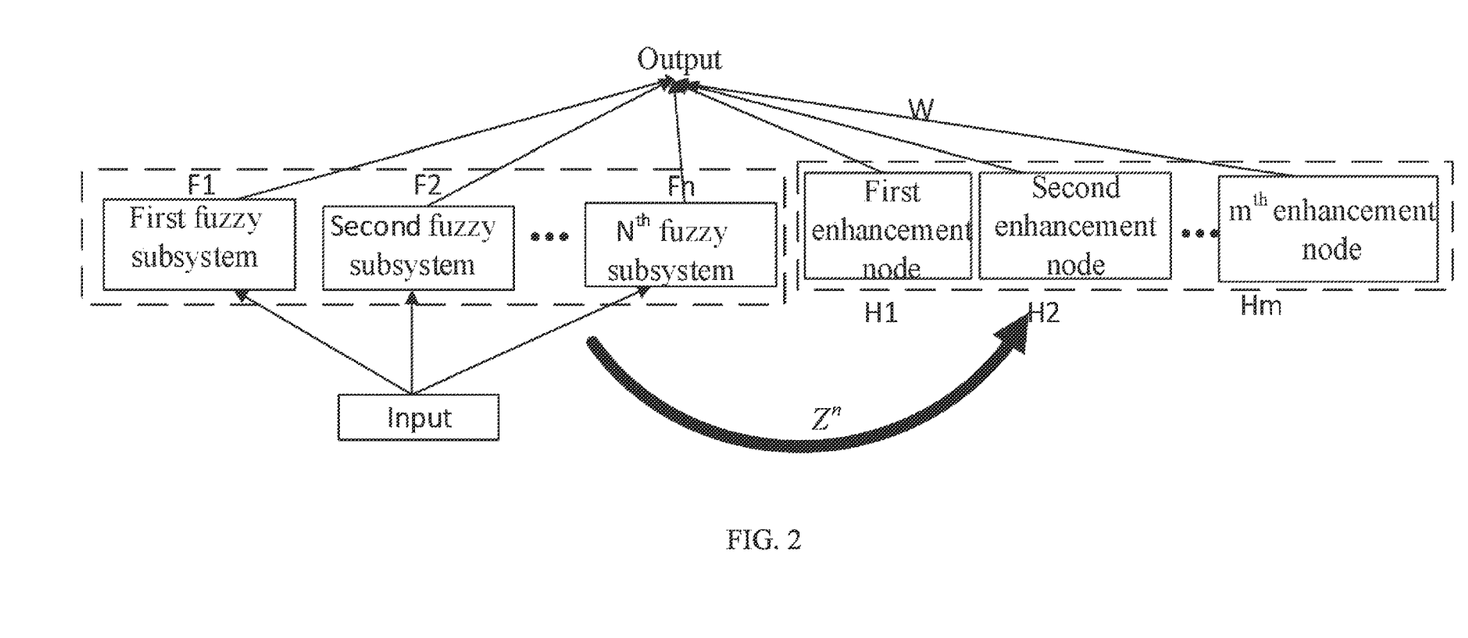
FIG. 2 is a structural framework schematic diagram of an initial fuzzy broad learning model according to one embodiment of the present disclosure.

Step S104: constructing an initial fuzzy broad learning model based on a broad learning system and a fuzzy system;

The initial fuzzy broad learning model is constructed by combining the broad learning system and the fuzzy system. The initial fuzzy broad learning model is specifically constructed by replacing the feature nodes of the broad learning system with a group of fuzzy subsystems in the fuzzy systems, and removing the sparse auto-encoder for finely adjusting a weight of a feature layer. Thus, structural complexity of the initial fuzzy broad learning model is reduced, and a basic structure of the initial fuzzy broad learning model is as shown in FIG. 2.

Figure 4:
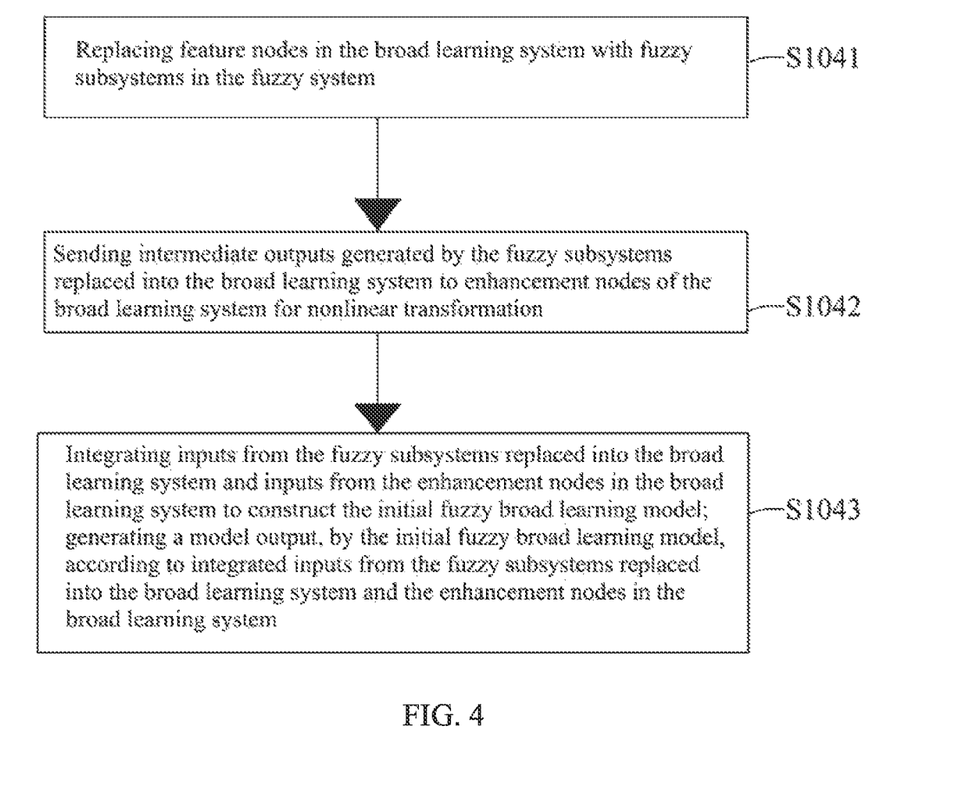
FIG. 4 is a flow chart of a step S104 according to one embodiment of the present disclosure.

Specifically, the step S104 comprises:
Step S1041: replacing feature nodes in the broad learning system with fuzzy subsystems in the fuzzy system;
Step S1042: sending intermediate outputs generated by the fuzzy subsystems replaced into the broad learning system to enhancement nodes of the broad learning system for nonlinear transformation; and Step S1043: integrating inputs from the fuzzy subsystems replaced into the broad learning system and inputs from the enhancement nodes in the broad learning system to construct the initial fuzzy broad learning model; generating a model output, by the initial fuzzy broad learning model, according to integrated inputs from the fuzzy subsystems replaced into the broad learning system and the enhancement nodes in the broad learning system.

Step S105: training the initial fuzzy broad learning model through the training set data to obtain a target fuzzy broad learning model; and In a process of training the initial fuzzy broad learning model through the training set data, a fuzzy broad learning parameter needs to be calculated as a weight of an enhancement layer output to the output layer, and first-order polynomial coefficients of all regular subsequent portions in the fuzzy subsystems need to be calculated.

Figure 3:
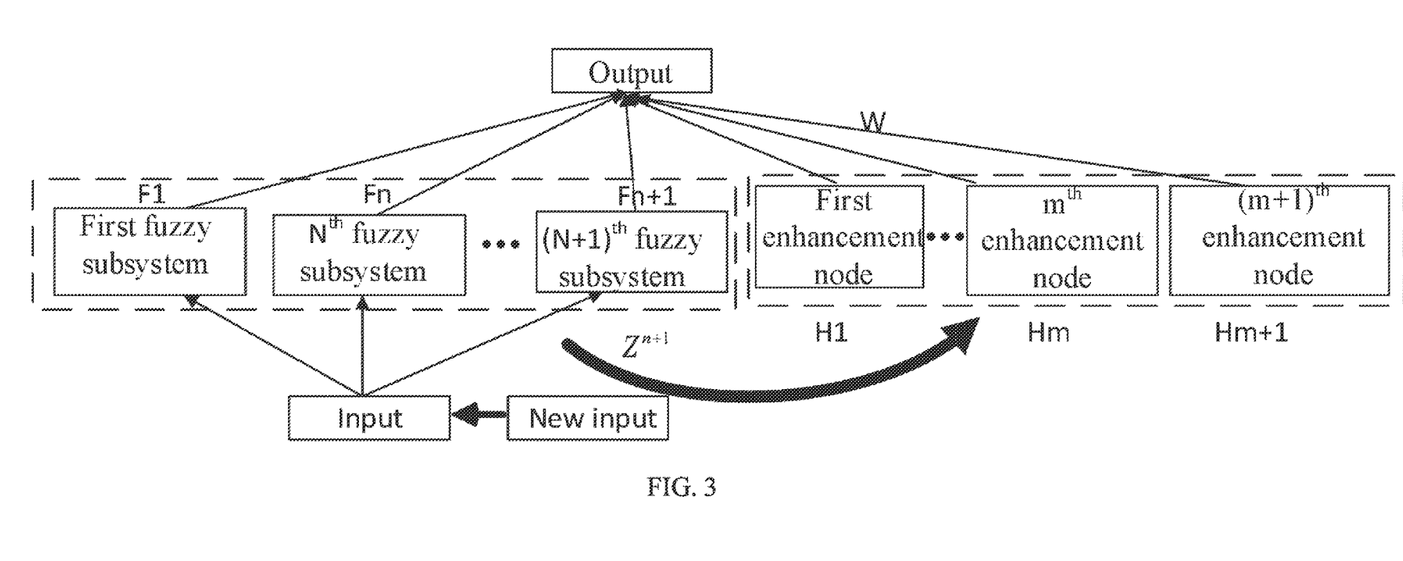
FIG. 3 is a structural framework schematic diagram of a target fuzzy broad learning model according to one embodiment of the present disclosure.

It is noted that the target fuzzy broad learning model can quickly process and calculate the pseudo-inverse by ridge regression approximation Compared with other neural fuzzy models adopting BP or other iterative training algorithms, the learning time of the target fuzzy broad learning model is greatly reduced. Moreover, since the target fuzzy broad learning model reserves a structure of the broad learning system, the target fuzzy broad learning model is easily adapted to increments of the input nodes, increments of the feature nodes, and increments of the enhancement nodes, without training the whole model network. That is, an incremental learning algorithm of the broad learning system can be extended to increments of the fuzzy subsystems, the increments of the input nodes, and the increments of the enhancement nodes. A structure of the target fuzzy broad learning model enhancing the input nodes and the enhancement nodes is shown in FIG. 3.

It is understood that depending on structural characteristics of the initial fuzzy broad learning model, data dimension reduction processing does not need to be performed on the data, but the training set data is directly input into the initial fuzzy broad learning model, and model parameters are adjusted, so that the bearing achieves the optimal diagnosis effect, and the target fuzzy broad learning model is obtained. The main parameters to be adjusted in the model are Fuzzy Rule, Fuzzy System, and Enhan, which respectively represent the number of fuzzy rules, the number of fuzzy systems, and the number of enhancement nodes.

Step S106: calculating a membership value of vibration signal data of a bearing to be tested by the target fuzzy broad learning model; and determining a fault type of the bearing to be tested according to the membership degree value.

Figure 5:
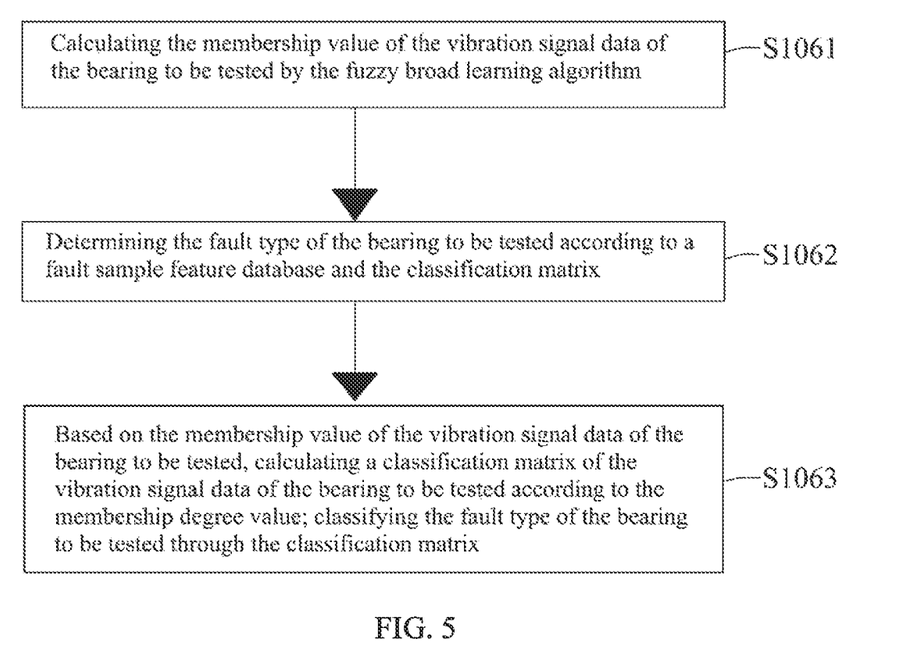
FIG. 5 is a flow chart of a step S106 according to one embodiment of the present disclosure.

The target fuzzy broad learning model comprises a fuzzy broad learning algorithm. The step S106 comprise:

Step S1061: calculating the membership value of the vibration signal data of the bearing to be tested by the fuzzy broad learning algorithm;

Step S1062: determining the fault type of the bearing to be tested according to a fault sample feature database and the classification matrix; and Step S1063: based on the membership value of the vibration signal data of the bearing to be tested, calculating a classification matrix of the vibration signal data of the bearing to be tested according to the membership degree value; classifying the fault type of the bearing to be tested through the classification matrix.

The fuzzy broad learning algorithm herein is the FCM algorithm, also known as the fuzzy C-mean algorithm. After extracting features from the bearing to be tested, the membership value of the vibration signal data of the bearing to be tested is calculated based on the fault sample feature database by the FCM algorithm, and which state of the bearing to be tested belongs to is determined according to membership degree value. Specifically, an input sample is defined as $X=\{x_1, x_2, \ldots x_n\}$, a fuzzy classification matrix is defined as $U=[U_{ij}]_{c \times n}$ and a clustering center vector is defined as $v=[v_1, v_2, v_3 \ldots v_c]^T$.

Where c is the number of clustering center vectors, n is the number of input samples, $u_{ij}$ is a membership value of a $j^{th}$ data point $x_j$ relative to an $i^{th}$ clustering center $v_i$. $d_{ij}$ is a Euclidean distance of the $j^{th}$ data point $x_j$ relative to the $i^{th}$ clustering center $v_i$. Then, $$d=\|x_j-v_j\|=(x_j-v_i)^T.$$

In order to obtain the classification matrix U, the objective function of FCM is defined as $$J(U, V) = \sum_{j=1}^{n} \sum_{i=1}^{c} u_{ij}^m d_{ij}.$$

Where m is a fuzzy weighting index, and the classification matrix U is obtained by calculating based on the principle of the fuzzy broad learning algorithm (the FCM algorithm). The fault types are classified according to U.

It should be noted that the membership value $u_{ij}$ itself is a raw data, which is a randomly generated matrix that is constantly iteratively corrected at a later stage, and a iterative formula of the membership value $u_{ij}$ is shown as follow:

$$u_{ij} = \frac{1}{\sum_{k=1}^{V}\left(\frac{x_j - v_i}{x_j - c_k}\right)^{\frac{2}{m-1}}}$$

A iterative formula of the clustering center $v_i$ is shown as follow:

$$v_i = \frac{\sum_{i=1}^{N} u_{ij}^m X_j}{\sum_{i=1}^{N} u_{ij}^m}$$

By the above two iterative formulas, it can be seen that the membership value $u_{ij}$ and the clustering center $V_i$ are associated with each other and include the opposite party. When a program starts, the $u_{ij}$ is randomly generated, as long as the value meets a predetermined condition, then the $u_{ij}$ starts to iterate. Then, $V_i$ is calculated by $u_{ij}$. A calculation process thereof is run in cycles. The target function J is keeping changed and gradually tends to be stable. That is, when J does not changes, the FCM algorithm is considered to converge to a good result.

In the present disclosure, by constructing the initial fuzzy broad learning model and by training the initial fuzzy broad learning model through processed training set data, the target fuzzy broad learning model is obtained. The target fuzzy broad learning model reserves the structure of the broad learning system and is able to be popularized to the increments, the input nodes, and the enhancement nodes of the fuzzy subsystems in the fuzzy system, so that the target fuzzy broad learning model is easily adapted to the increments of the input nodes, the feature nodes, and the enhancement nodes without retraining the target fuzzy broad learning model. When calculating the membership value of the vibration signal data of the bearing to be tested by the target fuzzy broad learning model and determining the fault type of the bearing to be tested according to the membership degree value, learning time is greatly reduced. Moreover, when determining the fault type of the bearing to be tested by the target fuzzy broad learning model, it has strong robustness, fast diagnosis speed and high fault diagnosis accuracy.

In some embodiments, after the step of training the initial fuzzy broad learning model through the training set data to obtain the target fuzzy broad learning model, the bearing fault diagnosis method further comprises:

testing the target fuzzy broad learning model by the test set data, and determining whether the target fuzzy broad learning model is qualified according to a test result; and if yes, executing a step of calculating the membership value of the vibration signal data of the bearing to be tested by the target fuzzy broad learning model.

A step of testing the target fuzzy broad learning model by the test set data specifically comprises inputting the test set data into the target fuzzy broad learning model, calculating a membership relationship between sample data to be tested, determining which fault type of the sample data to be tested through the fuzzy broad learning algorithm (the fuzzy C-means algorithm) and classifying the fault types, and finally giving an accuracy rate and a training time. It should be noted that when the accuracy rate and the training time both satisfy predetermined qualified conditions, it is indicated that the target model broad learning model is qualified.

In some embodiments, before a step of determining the fault type of the bearing to be tested according to the fault sample feature database and the classification matrix, the bearing fault diagnosis method further comprises constructing the fault sample feature database.

The fault sample feature database comprises bearing vibration signal samples with fault type labels. Each of the fault type labels is matched with a label matrix.

A step of defining the fault type labels specifically comprises: constructing label matrixes of different fault types, marking the fault types in columns as a fault type label, and taking the fault type labels as labels trained by the initial fuzzy broad learning model.

Furthermore, in the step of defining the fault type labels, for the bearing vibration signals with different fault types, the fault types are marked by constructing the label matrixes, that is, the $i^{th}$ fault type is arranged at a position corresponding to a $i^{th}$ column of a matrix 1, and the other positions are set to be 0.

In some embodiments, after a step of constructing the fault sample feature database, the bearing fault diagnosis method further comprises classifying samples of known fault types through the fuzzy broad learning model based on the fault sample feature database.

The fault type detected as a known fault type is input as a model and is classified by the target fuzzy broad learning model.

In some embodiments, calculation formulas of the classification matrix are as follow:

$U=[U_{ij}]_{c\times n}$;

$v=[v_1,v_2,v_3 \ldots v_c]^T$;

$d=\|xj-vj\|=(x_j-v_i)^T$;

$J(U, V) = \sum_{j=1}^{n} \sum_{i=1}^{c} u_{ij}^m d_{ij}$.

Where J is a target function. $u_{ij}$ is the membership value of a $j^{th}$ data point $x_j$ relative to an $i^{th}$ clustering center vi; $d_{ij}$ is a Euclidean distance of the $j^{th}$ data point $x_j$ relative to the $i^{th}$ clustering center $v_i$; U is the classification matrix. V is the clustering center vector. $x_j$ is the $j^{th}$ input sample. $v^i$ is the $i^{th}$ clustering center vector. c is the number of clustering center vectors. n is the number of input samples. m is the fuzzy weighting index; T is a transposed symbol.

In some embodiments, the initial fuzzy broad learning model comprises the fuzzy subsystems, the enhancement nodes, and a system output. The step of training the initial fuzzy broad learning model through the training set data to obtain the target fuzzy broad learning mode comprises:

after inputting the training set data into the initial fuzzy broad learning model, continuously adjusting parameter values of the fuzzy subsystems, the enhancement nodes, and the system output until an optimal result is output, so as to obtain the target fuzzy broad learning model.

In the embodiment, a specific implementation method is further provided, and in the specific implementation method, original data of the embodiment is selected from data sets of three experiment tables, which are respectively bearing disclosed experimental data provided by the bearing data center of the Case Western Reserve University (CWRU), Pump bearing data provided by the scholar Anil Kumar, and Qianpeng bearing data collected by the test table of the present disclosure.

The specific implementation method is configured to detect the bearings of the train and is implemented by the bearing fault diagnosis method based on a fuzzy broad learning model. The specific implementation method and a result thereof are as follows.

S1: extracting features.

Firstly, collected original data of the bearings is reconstructed. Specifically, a first group of data provided by the CWRU is cut into seven fault types; and each of the fault type comprises 50 samples. A sampling frequency of 12 kHz and a load of 0 HP are selected as operating conditions.

The seven fault types comprise 50 bearing vibration signals in a normal state, 50 bearing vibration signals indicating a rolling element fault with a damage diameter of 0.1778 mm, 50 bearing vibration signals indicating a rolling element fault with a damage diameter of 0.533 mm, 50 bearing vibration signals indicating an inner ring fault with a damage diameter of 0.1778 mm, 50 bearing vibration signals indicating an inner ring fault with a damage diameter of 0.533 mm, 50 bearing vibration signals indicating an outer ring fault with a damage diameter of 0.1778 mm, and 50 bearing vibration signals indicating an outer ring fault with a damage diameter of 0.533 mm. A second group of the PUMP bearing data is cut into five fault types, and each of the five faults types comprises 100 samples. The five fault types are respectively a normal state, an inner ring fault, an outer ring fault, an impeller fracture, and an impeller blockage. A third group of Qianpeng bearing data is cut into seven fault types, and each of the seven fault types thereof comprises 100 sample. A rotating speed of 1188 r/min, a sampling frequency of 12 kHz, and a radially unloaded condition are selected as operating conditions. The seven fault types are respectively a normal state, an inner ring fault with a damage diameter of 0.05 mm, an inner ring fault with a damage diameter 1.5 mm, an outer ring fault with a damage diameter of 0.05 mm, an outer ring fault with a damage diameter of 1.5 mm, a rolling element fault with a damage diameter of 0.05 mm, and a rolling element fault with a damage diameter of 0.45 mm. Then, time-domain features, frequency-domain features, and time-frequency-domain features are extracted to obtained feature sets, then each of the feature sets is normalized, and each normalized feature set is configured as an input feature vector.

S2: defining fault type labels;

Specifically, a label matrix of i×n is constructed, where i is a total number of the fault types, and n is a total number of samples. Taking the Pump bearing data as an example, the Pump bearing data comprises seven fault types of 700 samples, and each of the seven fault types comprises 100 samples. Then, it is notated that the $i^{th}$ fault type corresponds to the $i^{th}$ column of the label matrix, and the samples are arranged in sequence. For example, the first 100 samples are fault types 1, then values of the first to a hundred rows of the label matrix are 1, values of other columns corresponding to the first to the first hundred rows are 0, and the complete label matrix is constructed by analogy.

S3: training the FBLS model. Specifically, the three data sets are divided into a training set and a test set at a ratio of 8:2. The training set is input into the initial FBLS model, and the FBLS model is mainly composed of fuzzy systems, enhancement nodes, and a system output, so that when the model is trained, corresponding parameters need to be adjusted to obtain an optimal result. Finally, the parameter value Fuzzy Rule is determined to be 8, a value of the Fuzzy System is determined to be 11, a value of Enhan is determined to be 20, and the model has been trained. The Fuzzy Rule, the Fuzzy System, and the Enhan respectively represent the number of the fuzzy rules, the number of the fuzzy systems, and the number of the enhancement nodes.

S4: testing a fault type. The test set is input into the trained FBLS model, and when the fault type is divided, calculating the membership value between the samples by the FCM algorithm, and determining which fault type of bearing to be tested belongs to according to the membership value.

Specifically, an input sample is defined as $X=\{x_1, x_2, \ldots x_n\}$, a fuzzy classification matrix is defined as $U=[U_{ij}]_{c \times n}$ and a clustering center vector is defined as $v=[v_1, v_2, v_3 \ldots v_c]^T$, where c is the number of the clustering center vectors, n is the number of the samples, $u_{ij}$ is a membership value of the $j^{th}$ data point $x_j$ relative to the $i^{th}$ clustering center vi; $d_{ij}$ is the Euclidean distance of the $j^{th}$ data point $x_j$ relative to the $i^{th}$ clustering center $v_i$, J is the target function. Then, $d=\|xj-vj\|=(x_j-v_i)^T$ and $J(U, V)=\Sigma_{j=1}^n \Sigma_{i=1}^c u_{ij}^m d_{ij}$.

Where m is the fuzzy weighting index, and the classification matrix U is obtained by calculating based on the principle of the fuzzy broad learning algorithm (the FCM algorithm). The fault types are classified according to U.

An accuracy rate of the training set, an accuracy rate of the test set, a training time, and a test time are output via the fuzzy broad learning model. Final diagnostic results of the three data sets are shown in the following table.

| Data set | The number of fault types | Training accuracy rate | Training time | Test accuracy rate | Test result |
|---|---|---|---|---|---|
| QianPeng | 7 | 77.50% | 0.32242 s | 81.43% | 0.09833 s |
| Pump | 5 | 99.25% | 0.73846 s | 100% | 0.32178 s |
| CWRU | 7 | 98.57% | 0.60305 s | 100% | 0.18561 s |

It can be seen from the table that when the fuzzy broad learning model is used for bearing fault diagnosis, the time required for training or testing is less than or equal to 1 s, and the test accuracy rate reaches 100% on the Pump data set and the CWRU data set, Although the test accuracy rate of the Qianpeng data set is 81.43%, in practice, the specific accuracy rate is enough to quickly and accurately diagnose the train bearings, so that the fault types of the train bearings can be quickly and accurately diagnosed in practice.

It should be noted that the steps shown in the process or the flow chart of the accompanying drawings may be executed in a computer system capable of executing a set of computer instructions. Further, although a logical order is shown in the flow chart, in some cases, the illustrated or described steps may be performed in a different order.

Technical features of the above-mentioned embodiments can be combined arbitrarily. For the sake of brevity, all possible combinations of the technical features in the above-mentioned embodiments are not described. However, as long as there is no contradiction between the combinations of these technical features, the combinations should be considered to be within the scope of the specification.

The above-mentioned embodiments only represent some embodiments of the present disclosure. The descriptions thereof are specific and detailed, but should not be construed as a limitation of the scope of the present disclosure. It should be pointed out that for those of ordinary skill in the art, without departing from the concept of the present disclosure, modifications and improvements can be made. The modifications and the improvements belong to the protection scope of the present disclosure. Therefore, the protection scope of the present disclosure should be subject to the attached claims.

What is claimed is:

1. A bearing fault diagnosis method based on a fuzzy broad learning model, comprising:
    collecting vibration signal data of bearings in operation, and preprocessing the vibration signal data of the bearings in operation;
    extracting time-domain feature parameters, frequency-domain feature parameters, and time-frequency-domain feature parameters from preprocessed vibration signal data;
    performing a fusion processing and a normalization processing on the time-domain feature parameters, the frequency-domain feature parameters, and the time-frequency-domain feature parameters in sequence to obtain a fused data set; dividing the fused data set into training set data and test set data according to a predetermined ratio;
    constructing an initial fuzzy broad learning model based on a broad learning system and a fuzzy system;
    training the initial fuzzy broad learning model through the training set data to obtain a target fuzzy broad learning model;
    calculating a membership value of vibration signal data of a bearing to be tested by the target fuzzy broad learning model; and determining a fault type of the bearing to be tested according to the membership degree value;
    wherein the target fuzzy broad learning model comprises a fuzzy broad learning algorithm; a step of calculating the membership value of the vibration signal data of the bearing to be tested by the target fuzzy broad learning model and determining the fault type of the bearing to be tested according to the membership value comprises:
    calculating the membership value of the vibration signal data of the bearing to be tested by the fuzzy broad learning algorithm, and calculating a classification matrix of the vibration signal data of the bearing to be tested according to the membership degree value; and
    classifying the fault type of the bearing to be tested through the classification matrix.

2. The bearing fault diagnosis method based on the fuzzy broad learning model according to claim 1, wherein a step of preprocessing the vibration signal data of the bearings in operation comprises:
- extracting different vibration signal data features from the vibration signal data of the bearings in operation; and
- cropping the vibration signal data of the bearings in operation to obtain vibration signal samples, each of the vibration signal samples is matched with a corresponding vibration signal data feature of the vibration signal data features.

3. The bearing fault diagnosis method based on the fuzzy broad learning model according to claim 1, wherein the normalization processing is expressed by a function formula:

$$x' = \frac{x - \min(x)}{\max(x) - \min(x)}$$

wherein x is a total feature set formed by fusing the time-domain feature parameters, the frequency-domain feature parameters, and the time-frequency-domain feature parameters, x' is a normalized feature set, min (x) is a minimum value of the total feature set, and max (x) is a maximum value of the total feature set.

4. The bearing fault diagnosis method based on the fuzzy broad learning model according to claim 1, wherein a step of constructing the initial fuzzy broad learning model based on the broad learning system and the fuzzy system comprises:
- replacing feature nodes in the broad learning system with fuzzy subsystems in the fuzzy system;
- sending intermediate outputs generated by the fuzzy subsystems replaced into the broad learning system to enhancement nodes of the broad learning system for nonlinear transformation; and
- integrating inputs from the fuzzy subsystems replaced into the broad learning system and inputs from the enhancement nodes in the broad learning system to construct the initial fuzzy broad learning model; generating a model output, by the initial fuzzy broad learning model, according to integrated inputs from the fuzzy subsystems replaced into the broad learning system and the enhancement nodes in the broad learning system.

5. The bearing fault diagnosis method based on the fuzzy broad learning model according to claim 1, wherein after a step of training the initial fuzzy broad learning model through the training set data to obtain the target fuzzy broad learning model, the bearing fault diagnosis method further comprises:
- testing the target fuzzy broad learning model by the test set data, and determining whether the target fuzzy broad learning model is qualified according to a test result; and if yes, executing a step of calculating the membership value of the vibration signal data of the bearing to be tested by the target fuzzy broad learning model.

6. The bearing fault diagnosis method based on the fuzzy broad learning model according to claim 1, wherein before a step of determining the fault type of the bearing to be tested according to the fault sample feature database and the classification matrix, the bearing fault diagnosis method further comprises:
- constructing the fault sample feature database;
- wherein the fault sample feature database comprises bearing vibration signal samples with fault type labels; each of the fault type labels is matched with a label matrix.

7. The bearing fault diagnosis method based on the fuzzy broad learning model according to claim 6, wherein after a step of constructing the fault sample feature database, the bearing fault diagnosis method further comprises:
- classifying samples of known fault types through the fuzzy broad learning model based on the fault sample feature database.

8. The bearing fault diagnosis method based on the fuzzy broad learning model according to claim 1, wherein calculation formulas of the classification matrix are as follow:

$$U = [U_{ij}]_{c \times n};$$

$$v = [v_1, v_2, v_3 \ldots v_c]^T;$$

$$d = \|x_j - vj\| = (x_j - v_i)^T;$$

$$J(U, V) = \sum_{j=1}^{n} \sum_{i=1}^{c} u_{ij}^m d_{ij};$$

wherein J is a target function; $u_{ij}$ is a membership value of a $j^{th}$ data point $x_j$ relative to an $i^{th}$ clustering center vi; $d_{ij}$ is a Euclidean distance of the $j^{th}$ data point $x_j$ relative to the $i^{th}$ clustering center $v_i$; U is the classification matrix; V is a clustering center vector; $x_j$ is a $j^{th}$ input sample; $v_i$ is a $i^{th}$ clustering center vector; c is the number of clustering center vectors; n is the number of input samples; m is a fuzzy weighting index; T is a transposed symbol.

9. The bearing fault diagnosis method based on the fuzzy broad learning model according to claim 1, wherein the initial fuzzy broad learning model comprises fuzzy subsystems, enhancement nodes, and a system output; a step of training the initial fuzzy broad learning model through the training set data to obtain the target fuzzy broad learning mode comprises:
- after inputting the training set data into the initial fuzzy broad learning model, continuously adjusting parameter values of the fuzzy subsystems, the enhancement nodes, and the system output until the output is optimal, so as to obtain the target fuzzy broad learning model.

* * * * *